Patented May 14, 1946

2,400,164

UNITED STATES PATENT OFFICE 2,400,164

ARTICLES OF RUBBERLIKE MATERIAL

Charles R. Peaker, Union City, Conn., assignor to United States Rubber Company, New York, N. Y., a corporation of New Jersey No Drawing. Application May 10, 1943, Serial No. 486,429

2 Claims. (Cl. 18—58)

This invention relates to articles of rubber-like material, and more particularly to improving the tensile strength of articles directly deposited from aqueous dispersions of rubber-like copolymers of butadiene and styrene.

Synthetic rubber-like materials, or so-called artificial rubbers, which are copolymers of butadiene and another polymerizable material, such as styrene, generally in the range of 40 to 90 parts of butadiene per 100 parts of the mixture of polymerizable materials, are known. Aqueous dispersions of such synthetic rubber-like materials are formed in a known manner by the emulsion-copolymerization in an aqueous medium of the butadiene and styrene. Such aqueous dispersions of these synthetic rubber-like materials when compounded with the usual vulcanizing agents and accelerators, and dried to form a film and vulcanized, give stocks which have very low tensile strengths. It is necessary to materially improve the tensile strength of articles that are deposited directly from aqueous dispersions of copolymers of butadiene and styrene. It is also desirable in many cases to increase the cohesiveness or "tack" in the unvulcanized state, particularly where the deposited film is to be vulcanized to a fabric or other backing, as in the manufacture of laminated articles.

I have discovered that the addition of a polyterpene hydrocarbon resin to such an aqueous dispersion of a copolymer of butadiene and styrene increases the tensile strength of articles deposited directly from the artificial rubber dispersion, and also increases the tack of the film in the unvulcanized state. Polyterpene hydrocarbon resins are made by the catalytic polymerization of turpentine and are thermoplastic in nature. They are sold under the trade names "Nypene" and "Piccolyte" resins. They may be readily emulsified with water by agitation with a dispersing agent, such as a soap, and the emulsion thus formed added directly to the dispersion of the copolymer of butadiene and styrene.

The article may be directly deposited from an aqueous dispersion of such synthetic rubber-like material containing the polyterpene hydrocarbon resin and vulcanizing ingredients, in any of the conventional ways of manufacturing articles directly from rubber latex, as for example, by dipping a form into the dispersion, or spraying the dispersion onto a form, or by spreading the dispersion on a belt or so-called blanket, if the article is to be a sheet, and drying, and vulcanizing. The deposition on a form may be speeded up, as in conventional rubber latex practices, by treating the form first with a coagulant for the dispersion, and then dipping into the dispersion of rubber-like material, or by dipping first in the dispersion, then coagulating the film by dipping the form into the coagulant, and again dipping in the dispersion and allowing the form to remain in the dispersion until the desired thickness of rubber-like material has been built up. These manipulative procedures for directly depositing rubber articles directly from latex are well known, and similar methods may be utilized in depositing articles directly from dispersions of these synthetic rubber-like materials. If desired, the article may be composed wholly of the synthetic rubber-like material directly deposited from the dispersion or it may be in the form of a base material coated with, or otherwise having attached thereto, such direct deposit of an aqueous dispersion of the synthetic rubber-like material. The increase in tackiness imparted to the unvulcanized deposit is of importance in the manufacture of articles where the deposit of the synthetic rubber-like material is vulcanized to a fabric or other backing which may form part of the article.

The improvement in tensile strength of films deposited from aqueous dispersions of copolymers of butadiene and styrene by the addition of polyterpene hydrocarbon resins to the dispersion is illustrated in the following examples:

Example I

A dispersion was prepared by the conjoint emulsion-polymerization in an aqueous medium of 75 parts of butadiene-1,3 and 25 parts of styrene in the presence of 5 parts of soap (commercial "Ivory Soap Flakes"). After polymerization was complete and the product had been steam distilled to remove unreacted reagents, the solids content of the dispersion was 17.4%. This dispersion was concentrated by adding 6.7 parts of a 3% aqueous solution of ammonium alginate per 100 parts of dispersion, and allowing to stand two days, whereupon the dispersion creamed in a supernatant layer and 33.6% content cream was removed from the serum portion. The cream was further concentrated by adding thereto 5.0 parts of a 3% aqueous solution of ammonium alginate and 3.4 parts of a 10% aqueous solution of potassium hydroxide per 100 parts of dispersion, and allowing to stand five days, giving a 40.7% solids content cream. To 222 parts by weight of the 40.7% solids content cream as thus prepared was added a 24-hour ball-milled paste of vulcanizing ingredients comprising:

| | Parts by weight |
|---|---|
| Sulphur | 2 |
| Zinc oxide | 3 |
| Zinc mercaptobenzothiazole (accelerator) | 1.5 |
| Zinc dibutyldithiocarbamate (accelerator) | .5 |
| Commercial dispersing agents | .45 |

The above compounded dispersion of the copolymer of butadiene and styrene was mixed with amounts of two commercial polyterpene hydrocarbon resins to give 20 and 50 parts of polyterpene hydrocarbon resin per 100 parts of dispersion solids. The polyterpene hydrocarbon resins were prepared by heating separately to 70° to 80° C. a solution of 100 parts of the polyterpene hydrocarbon resin in 100 parts of solvent naphtha containing 10 parts of oleic acid and an aqueous solution of 10 parts of 25% dimethylamine in 180 parts of water and adding the polyterpene hydrocarbon resin in solvent to the aqueous dimethylamine with high speed stirring to form a 25% aqueous emulsion of the polyterpene resin. The requisite amount of the 25% polyterpene hydrocarbon resin emulsion was added to the aqueous dispersion of the copolymer of butadiene and styrene with stirring. Test films were prepared in this and the following examples by spreading the dispersion compounds on level glass plates and drying over night at room temperature (70° to 80° F.) giving a thickness of about 0.015 inch. The films were then stripped from the glass plates, dusted to prevent sticking together, and vulcanized in an air oven at 100° C. Results (averages of a range of cure) of measurements of tensile strength, and elongation at break of test pieces cut from the vulcanized films, together with the percent of permanent set, measured immediately after breaking the test strip, are tabulated below:

| Percent polyterpene hydrocarbon resin on the copolymer solids | Polyterpene resin used | Tensile strength, lbs. per sq. in. | Ultimate elongation, percent | Permanent set, percent |
|---|---|---|---|---|
| 0 | 0 (control) | 225 | 325 | 10 |
| 20 | Nypene | 312 | 419 | 13 |
| 50 | do | 389 | 519 | 24 |
| 20 | Piccolyte S-100 | 423 | 476 | 18 |
| 50 | do | 520 | 553 | 19 |

*Example II*

In this case to 222 parts by weight of the 40.7% solids content cream as prepared in Example I was added a 24 hour ball-milled paste of vulcanizing ingredients comprising:

| | Parts by weight |
|---|---|
| Sulphur | 2 |
| Zinc oxide | 3 |
| Zinc mercaptobenzothiazole (accelerator) | 1.5 |
| Zinc dibutyldithiocarbamate | .5 |
| Commercial dispersing agents | .6 |
| Water | 5.4 |

The thus compounded dispersion of the copolymer of butadiene and styrene was mixed with amounts of a 40% aqueous emulsion of a polyterpene hydrocarbon resin sold under the trade name "Piccolyte S-85" to give 20 and 50 parts of the polyterpene resin per 100 parts of dispersion solids. In this case the "Piccolyte S-85" aqueous emulsion was prepared by first heating to 70° to 80° C. 200 parts of "Piccolyte S-85", 150 parts of methylisobutyl ketone and 20 parts of oleic acid (parts by weight), and separately 20 parts of 25% dimethylamine aqueous solution with 110 parts of water, and adding the "Piccolyte S-85" in the methylisobutyl ketone and oleic acid to the dimethylamine solution with high speed stirring. Test films were prepared as above described and tested with the following results:

| Per cent Piccolyte S-85 on the copolymer solids | Tensile strength, lbs. per sq. in. | Ultimate elongation, per cent | Permanent set, per cent |
|---|---|---|---|
| 0 | 234 | 520 | 13 |
| 20 | 631 | 715 | 20 |
| 50 | 609 | 708 | 30 |

It may be seen from Examples I and II that very definite improvements in tensile strength and ultimate elongation are imparted to articles deposited directly from aqueous dispersions of copolymers of butadiene and styrene by the addition of polyterpene hydrocarbon resins. The addition of the polyterpene resin also increases considerably the tack of the deposited film before vulcanization. With natural rubber latex, on the other hand, the addition of polyterpene hydrocarbon resins decreases both the tensile strength and elongation at break as shown in the following table where amounts of the aqueous emulsion of "Piccolyte S-85" used in Example II were mixed with a creamed natural rubber latex compounded similarly to Example II to give 20 and 50 parts of polyterpene hydrocarbon resin per 100 parts of rubber dispersion solids, and which dispersions were dried and vulcanized, and from the films of which test pieces were prepared and tested as above:

| Per cent Piccolyte S-85 on the copolymer solids | Tensile strength, lbs. per sq. in. | Ultimate elongation, per cent | Permanent set, per cent |
|---|---|---|---|
| 0 | 4,897 | 910 | 21 |
| 20 | 4,261 | 815 | |
| 50 | 2,520 | 767 | 21 |

It is evident that the effects of the addition of the polyterpene hydrocarbon resins are entirely different in natural rubber latex and in aqueous dispersions of copolymers of butadiene and styrene. It is noted that the addition of polyterpene hydrocarbon resins to the dispersion of butadiene and styrene increases to some extent the permanent set, but where such an increase in permanent set is not objectionable, or where the increase in permanent set is sufficient to overcome possible objections to permanent set, the present invention is of definite advantage.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A shaped article comprising the direct deposit of solids of an aqueous dispersion of a copolymer produced from a mixture of butadiene and styrene, said mixture containing 40 to 90 parts of butadiene per 100 parts of mixture, said dispersion containing 20 to 50 parts of separately polymerized thermoplastic polyterpene hydrocarbon resin made by the catalytic polymerization of terpentine per 100 parts of copolymer.

2. An aqueous dispersion of a copolymer produced from a mixture of butadiene and styrene, said mixture containing 40 to 90 parts of butadiene per 100 parts of mixture, said dispersion containing as a compounding ingredient 20 to 50 parts of separately polymerized thermoplastic polyterpene hydrocarbon resin made by the catalytic polymerization of turpentine per 100 parts of copolymer.

CHARLES R. PEAKER.